United States Patent
Waters et al.

(10) Patent No.: US 7,356,011 B1
(45) Date of Patent: Apr. 8, 2008

(54) SIMPLIFIED CONFIGURATION AND SECURITY FOR NETWORKED WIRELESS DEVICES

(75) Inventors: Christopher J. F. Waters, Palo Alto, CA (US); Nicholas J Kelsey, Mountain View, CA (US)

(73) Assignees: Mayfield XI, Menlo Park, CA (US); Mayfield XI Qualified, Menlo Park, CA (US); Mayfield Associates Fund VI, Menlo Park, CA (US); Mayfield Principals Fund II, Menlo Park, CA (US); Mayfield IX, Mayfield Associates Fund IV, Menlo Park, CA (US); The Chip Trust III, Menlo Park, CA (US); The Unger-Luchsinger Family Trust, Austin, TX (US); Jatotech Ventures, L.P., Austin, TX (US); Jatotech Affiliates, L.P., Austin, TX (US)

( * ) Notice: Subject to any disclaimer, the term of this patent is extended or adjusted under 35 U.S.C. 154(b) by 1098 days.

(21) Appl. No.: 10/323,439

(22) Filed: Dec. 18, 2002

(51) Int. Cl.
*H04L 12/18* (2006.01)

(52) U.S. Cl. .................................. 370/338; 380/258
(58) Field of Classification Search ............... None
See application file for complete search history.

(56) References Cited

U.S. PATENT DOCUMENTS

| 5,515,441 A * | 5/1996 | Faucher .................. 380/30 |
| 2002/0025042 A1 * | 2/2002 | Saito ..................... 380/258 |

OTHER PUBLICATIONS

PhonexBroadband NeverWire 14 User Guide; 2002; Phoenix Broadband Corporation; pp. 1-73.

* cited by examiner

*Primary Examiner*—Robert W. Wilson
(74) *Attorney, Agent, or Firm*—Fenwick & West LLP

(57) ABSTRACT

Wireless devices are easily configured with logical network and security settings. Configuration commands are received at master and slave wireless devices. The devices switch to predetermined logical network and security settings to allow communication between the master and slave devices. The master device selects a logical network and/or security setting and sends the setting(s) to the slave device. Both devices then switch to the selected setting(s) and use the setting(s) for future communications.

6 Claims, 12 Drawing Sheets

SIMPLIFIED CONFIGURATION AND SECURITY FOR NETWORKED WIRELESS DEVICES

BACKGROUND OF THE INVENTION

1. Field of the Invention

The invention relates to the field of networked devices and more particularly to simplified configuration of devices on a network.

2. Description of Background Art

Networked systems are becoming more and more prevalent, which has led to increasing instances of them being purchased, set up and used by relatively unsophisticated users. For example, many people are creating networks in their homes. Such a home network may contain multiple computers, printers, networking devices such as a router to connect the home network to the Internet, and other devices. The devices on the network may be connected by wires, wirelessly, or through a combination of the two. However, many relatively unsophisticated users have difficulty properly setting up and configuring their networked devices so they function correctly.

FIG. 1 is a block diagram of an example of a home network 100 that a user may attempt to set up in their home. Note that the network 100 need not be in a person's home. Typical examples of the network 100 include local area networks (LANs) in homes, but also in schools, offices, and other settings. The example network 100 illustrated in FIG. 1 includes a first computer 102 connected to a router 104 by a wire. The router 104 is connected to a second computer 106 and to a wireless access point 112 by wires. There is a printer 114 wirelessly connected to the wireless access point 112. In addition, the router 104 is wired to the Internet 108.

Users run into several problems when trying to set up and configure such a network 100. A first problem is that unsophisticated users have trouble connecting each device on the network, and configuring the devices to properly send data to each other. For example, unsophisticated users can have difficulty properly assigning Transmission Control Protocol/Internet Protocol (TCP/IP) addresses to the devices. Unsophisticated users have difficulty setting the devices to the proper subnet masks, assigning each device a unique IP address, setting a gateway address (for computer 102 to access the Internet 108 through the router 104, for example), and performing other actions.

This is particularly difficult for devices such as the router 104, which does not have a user interface integrated with the device. The unsophisticated user must access such a device through another device that has a user interface, such as computer 102. If the device to be configured has a preset IP address, the user needs to know that IP address in advance to access and configure it. Many unsophisticated users have difficulty ascertaining and using the IP address of the device to access and configure the device. Such users also have trouble overcoming other difficulties, such as if the subnet of the computer 102 is different than the subnet of the router 104. When users encounter such difficulties, the user often gives up and simply returns products to the place where they were purchased.

Some techniques exist for simplifying the task of assigning IP addresses, such as a Dynamic Host Configuration Protocol (DHCP) server. However, this does not solve all problems. For example, if the user must know the IP address to access a networked device, many unsophisticated users would have trouble discovering what IP address has been assigned to each device by the DHCP server, particularly if a DHCP server assigns an address to a device that lacks a user interface. Further, if the network 100 does not include a DHCP server, the user will have difficulties configuring devices that are designed to be used with a DHCP server for configuration. Again, unsophisticated users often give up when faced with such difficulties and return the devices to their place of purchase.

Users face similar problems when setting up a network 100 that includes wireless devices. In addition to configuring the devices with correct TCP/IP addresses, the user often must configure the devices to be on the same logical network. Multiple wireless access points on different logical networks may be spaced closely enough that devices may communicate with more than one access point. Information such as Service Set Identifiers (SSIDs) can be used to identify to which logical network a device belongs. Setting up the proper SSIDs so devices operate on the desired logical network is another layer of complexity for users.

An additional problem is that outside devices not under the user's control may also access the home network 100. People ("unauthorized accessor") who wish to access the user's network 100 without authorization by the user may be in control of these devices. The unauthorized accessor may access the network 100 and data stored on the devices in the network 100 to the detriment of the user. For example, an unauthorized accessor may use an outside device to discover the user's credit card number, and make numerous charges to the user's credit card account. The Internet 108 connects the router 104 to a large number of devices owned and operated by unknown people throughout the world, such as computer 110. Further, devices owned and operated by unauthorized accessors, such as computer 116, may be in close enough range to communicate wirelessly with the wireless devices 112, 114 on the user's home network 100. This makes it easy for an unauthorized accessor to access data on a user's wireless network.

There are security techniques to help prevent such unauthorized intrusions. For example, Wired Equivalent Privacy (WEP) is a security protocol for wireless local area networks. Encryption may also be used for wired networks. However, unsophisticated users may fail to implement such security measures, even if the security measure is available. The user may not understand how to implement the security measure, or may try to implement the measure and fail. The result is that a user often leaves their network 100 unsecured.

What is needed is a system and method that allows a user to easily configure their network, and to easily implement security measures.

SUMMARY OF THE INVENTION

The present invention provides simplified configuration of devices on a network. A device addressing protocol (DAP) and a configuration protocol (CP) are used to communicate with and configure remote devices on a network. The device addressing protocol addresses and allows communication identification with remote devices even when the addresses, such as the IP address, for the remote device are not known. The configuration protocol allows a first device to request a method call on a remote device. The configuration protocol is encapsulated in the device addressing protocol, which allows the identification of the requested method call to be addressed to the correct device(s). The configuration protocol also allows for arguments to the requested method call to be sent to the remote device(s), and allows remote devices to send responses to the remote method call back to the device that sent the remote method call.

Once remote devices are identified, the device addressing protocol and configuration protocol provides a simple way for a user to configure one or more remote devices. The user selects a configuration action, such as setting IP addresses, and selects what devices will be configured, such as all identified devices. The present invention then acts to send remote method call requests to the selected remote devices. The remote method call requests function to perform the desired configuration action. Thus, the user does not need to tediously configure each remote device individually, nor does the user need to know the "nuts and bolts" of how to configure the remote devices as desired.

The present invention can also provide simplified implementation of security features. A master device selects a key for security purposes and transmits this key, either with secure measures such as with public/private key measures, or "in the clear" to the remote device(s). Remote method call requests are also sent along with the key. In response to the remote method call request, remote devices implement secure communication measures using the key.

Further, the present invention may simplify a procedure for matching wireless devices. After entering commands on both devices to be matched, each device switches to a predetermined logical wireless network. A master device selects a logical wireless network for the devices to use and communicates this selection to the slave device. The master and slave device then switch to the selected logical wireless network. In addition, the master device may also select a security key and communicate it to the slave device. When the master and slave switch to the selected logical wireless network, they also both implement secure communication measures using the key.

DETAILED DESCRIPTION OF THE PREFERRED EMBODIMENTS

Figure 1:
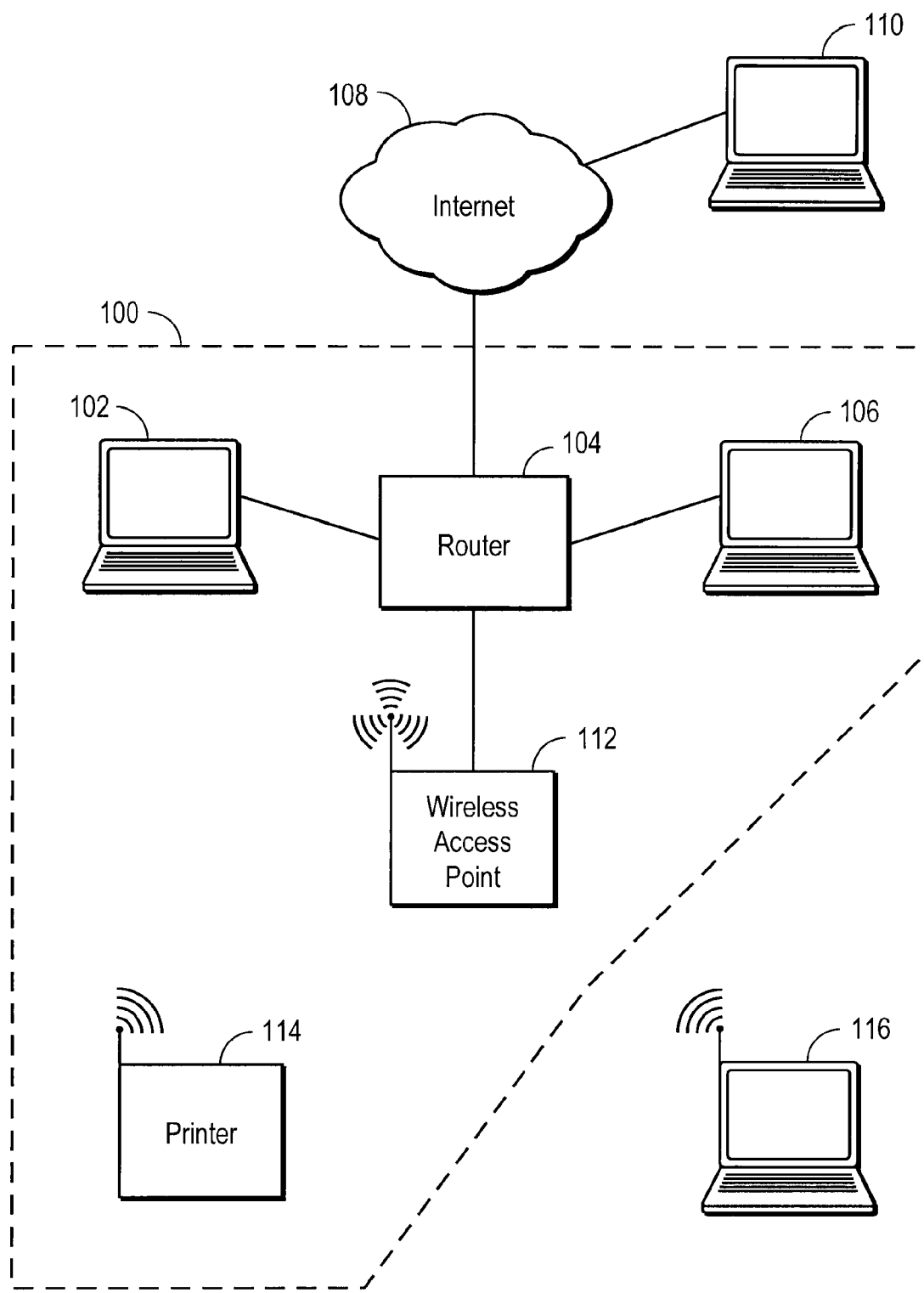
FIG. 1 is a block diagram of an example of a network.

An embodiment of the present invention is now described with reference to the figures where like reference numbers indicate identical or functionally similar elements. Also in the figures, the left most digit(s) of each reference number corresponds to the figure in which the reference number is first used.

The present invention is a system and method that solves the above identified problems. Specifically, the present invention provides a way for users to easily configure their network, and to easily implement security measures. In one embodiment, the present invention uses a Device Addressing Protocol (DAP) and a Configuration Protocol (CP) to discover devices on a network and assign the devices a proper address. The DAP and CP may also be used to easily implement security measures and/or configure wireless devices.

DAP Overview:

DAP is an encapsulating protocol which specifies the address of the device to which the encapsulated contents should apply. The DAP protocol can be layered on top of a protocol stack, such as TCP/IP. One embodiment of the DAP protocol is described as follows.

The DAP header has the following format:

| Destination Address | 64 bits |
| Source Address | 64 bits |
| Sequence Number | 16 bits |
| Type | 16 bits |

The destination and source addresses have a flexible address scheme, to allow different types of addresses to be used. The first and second bytes indicate whether the data is being broadcast or not, and what type of address is contained in the other bytes. Some examples of address types follow. If the address is a User Datagram Protocol (UDP) address, the third through sixth bytes carry an IP address, and the seventh and eighth bytes carry an IP port. If the address is an Ethernet address, the third through eighth bytes carry the Media Access Control (MAC) address. If the address is a raw address, the third through eighth bytes carry the raw address or identifier. Typically, devices use their MAC address as their DAP address to ensure unique addresses.

The sequence field can be used to identify a particular packet in a sequence of packets. This can be helpful, for example, in detecting duplicate packets.

The type field identifies which protocol is encapsulated by the DAP header. For example, the type field can identify the CP as the encapsulated protocol, although other protocols may be encapsulated and identified by the type field as well.

CP Overview:

CP is a protocol that allows a device to request a method call at a remote device connected by a network. CP thus allows a device to make remote procedure calls. The request is encapsulated by a protocol such as DAP. Each CP request has a single response per device that receives and acts on the request. One embodiment of the CP protocol is described as follows.

The CP packet has the following format:

| Flags | 8 bits |
|---|---|
| Interface Number | 32 bits |
| Method Number | 16 bits |
| Arguments | Variable |

The flags indicate whether the packet is a request or response packet. For a request packet, bit 0 of the flag is set to 1. The interface number specifies the interface or class to which the method number belongs. For request CP packets, the method number specifies the method that is requested. For response CP packets, the method number specifies the method to which the response relates. The CP packet may contain arguments for the method being invoked, if the CP packet is a request, or values being returned in response to an invoked method.

An example method call that causes a remote device to set its IP address follows. It takes the form of "set.ip(IP address)." The "set.ip" is the method call that causes the receiving device to set its IP address. The "(IP address)" argument is the address to which the receiving device sets its IP address.

A series of tag-length-value tuples, known as options, is used to return multiple values from a method. Several examples of these tag-length-value responses to methods as used in one embodiment of the present invention follow:

MAC Address: The MAC address option has a tag number with a value of 1. The length for the MAC address option is 6. The values following provide the MAC address of the responding device.

Device Name: The device name option has a tag number with a value of 2. A device name is a human readable name for the device, and is typically set by the user to a locally significant name, such as "color printer." The length specified for the device name varies, depending on the length of the name. The length value is equal to the number of characters in the name. The values specify the characters of the device name.

Device Type: The device type option has, a tag number with a value of 3. A device type is a human readable name for the type of device. The device type is typically set by a manufacturer to describe the model of the device, e.g., "Acme Color Printer A456." Like the device name, the length of the device type varies, depending on the length of the device type description. The length value is equal to the number of characters in the device type. The values specify the characters of the device type.

Use DHCP: The use DHCP option has a tag number with a value of 4. A use DHCP option specifies whether DHCP should be used to acquire an IP address. The length of the use DHCP option is 1. A value of 1 indicates DHCP is used, 0 indicates that a static IP address is used.

IP Address: The IP address option has a tag number with a value of 5. An IP address option specifies the IP address assigned to the primary interface of the device. The IP address option has a length of 4, and the IP address is sent most-significant-byte first.

Subnet Mask: The subnet mask option has a tag number with a value of 6, and specifies the subnet mask assigned to the primary interface of the device. The length of the subnet mask option is 4. The subnet mask is sent most-significant-byte first.

Gateway Address: The gateway address option has a tag number with a value of 7, and specifies the IP address of the gateway to be used by the primary interface of the device. The length of the gateway address option is 4. The gateway address is sent most-significant-byte first.

Figure 2:
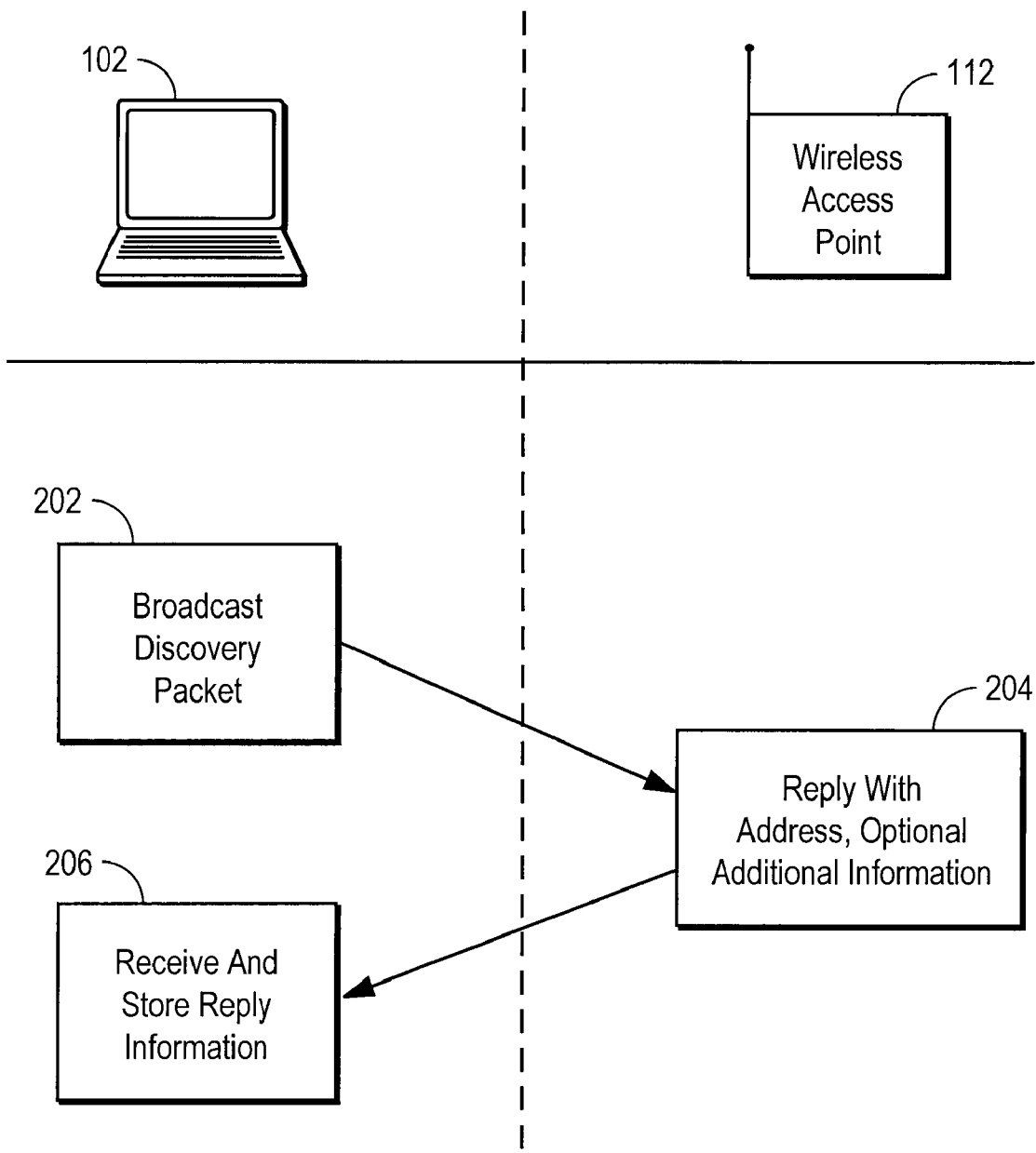
FIG. 2 is a diagram illustrating an example of how DAP and CP function to easily discover devices on a network according to one embodiment of the present invention.

Device Discovery:

DAP and CP can be used to easily discover and configure devices on a network. FIG. 2 is a diagram illustrating an example of how DAP and CP function to easily discover devices on a network. Typically in a discovery operation, one device is a discovering device, and one or more devices are discovered devices. In the example of FIG. 2, the discovering device is computer 102 on the home network 100, although other types of devices can also be the discovering device. Also in the example of FIG. 2, the wireless access point 112 is the discovered device, although different devices can also be discovered, and multiple devices can be discovered. The two devices 102, 112 in the described example communicate by wires via the router 104. However, the discovering and discovered devices can also communicate wirelessly, or by a combination of wires and wirelessly. The discovering device may have a user interface and discover other devices in response to a user command, or may operate to discover other devices without user input.

The user may begin the discovery process by issuing a command via a user interface. For example, the user may be presented with a user interface having a "locate network devices" command. When the user selects the "locate network devices" command, the discovery process begins. Alternately, a device can automatically begin the discovery process when it is first connected to a network and powered up. Further, a device can automatically periodically perform the discovery process so that information on other networked devices is up to date, even as devices are added to and removed from the network.

To begin discovering other devices on a network, the computer 102 broadcasts 202 a discovery packet. This packet is a DAP packet that encapsulates a CP method request. In one embodiment, the CP method is Addressing-.discover, which requests the address of the device that receives the packet. The destination addresses of the DAP packet are set to broadcast, so every device on the network receives the packet. In the described embodiment, both the discovering and discovered devices run DAP and CP, allowing proper response.

Figure 3:
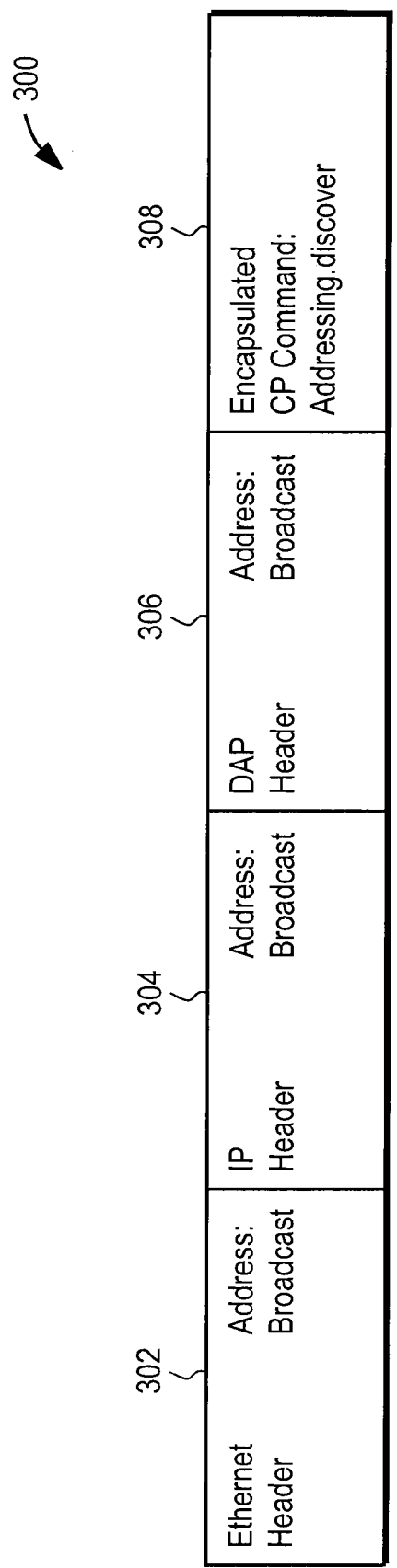
FIG. 3 is a block diagram illustrating the broadcast discovery packet according to one embodiment of the present invention.

FIG. 3 is a block diagram illustrating the broadcast discovery packet 300. The broadcast discovery packet 300 includes an Ethernet header 302 with the Ethernet destination address specified as broadcast, an IP header 304 with the IP destination address specified as broadcast, and a DAP header 306 with the DAP destination address specified as broadcast. The headers 302, 304, 306 of the broadcast discovery packet further specify the Ethernet, IP, and DAP addresses of the source device at which the discovery packet 300 originated, so that devices receiving the broadcast discovery packet 300 may respond to the correct device. An encapsulated CP request 308 provides the Addressing.discover command to the devices that receive the broadcast discovery packet 300.

Returning to FIG. 2, the wireless access point 112 receives the DAP packet and replies 204 by sending a DAP packet that includes a response to the CP Address.discover method request to the computer 102. The reply 204 sent by the wireless access point 112 includes the address of the wireless access point 112. This address can include the Ethernet address, the IP address, the DAP address, and/or other types of addresses used by the devices for communication. The wireless access point 112 can also reply with other optional information, such as a device name, a device type, or other information.

The computer 102 receives and optionally stores 206 the response from the wireless access point 112. The information included in the response provides the computer 102 with information that the wireless access point 112 is on the network 100, the address of the wireless access point 112, as well as any other information, such as the device type, sent by the wireless access point 112. Because the computer 102 now has stored information that the wireless access point 112 exists on the network as well as the address of the wireless access point 112, the computer 102 can communicate specifically with the wireless access point 112 without having to broadcast packets.

FIG. 2 illustrates only one device responding to the broadcast discovery packet. However, every device that receives the packet may respond to the discovering device 102. Thus, by broadcasting the discovery packet, the computer 102 can discover every device on the network 100, as well as the addresses of those devices. The computer 102 can then communicate with each device individually.

Once the computer 102 has discovered the other devices on the network 100, the computer 102 can send commands to the other devices. These commands can, for example, configure the devices, or set up security measures for communication between devices.

Figure 4:
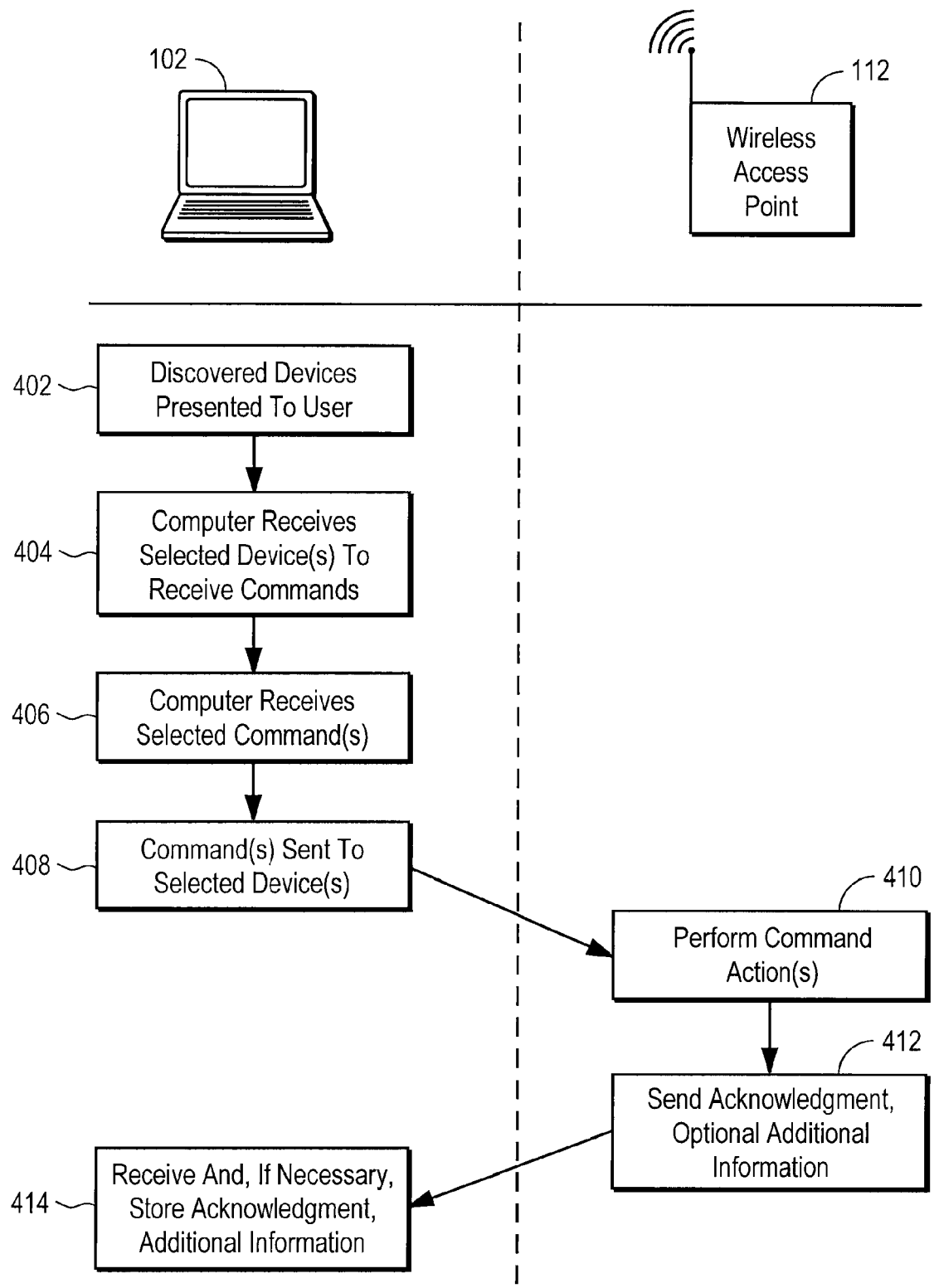
FIG. 4 illustrates an overview of how DAP and CP function to allow simple network device configuration according to one embodiment of the present invention.

Overview of Simplified Device Configuration:

FIG. 4 illustrates an overview of how DAP and CP function to allow commands, such as device configuration commands, to be sent to devices on the network. This makes it simple to perform configuration functions, so that even unsophisticated users can perform them correctly.

Typically when commands are issued, one device issues the commands, and one or more devices respond to the commands. In the example of FIG. 4, the device that issues the command is computer 102, and the device that responds to the command is wireless access point 112. Other types of devices may issue and respond to commands as well. Further, commands may be issued to multiple devices. FIG. 4 describes a device that issues commands in response to user action through a user interface. Note that the device may also issue commands automatically, without user input.

In one embodiment, the devices that have been discovered on the network are presented 402 to the user via the user interface. These devices may have been discovered through the process described with respect to FIG. 2, above, or through other methods. The user selects which device or devices will receive the command, and the computer 102 receives 404 this selection. The computer 102 also receives 406 the user's selection of what command or commands will be issued by the computer 102. The computer 102 then sends 408 the selected commands to the selected device or devices. In one embodiment, the commands are CP requests encapsulated by DAP packets, although the commands can also follow other formats.

Figure 5A:
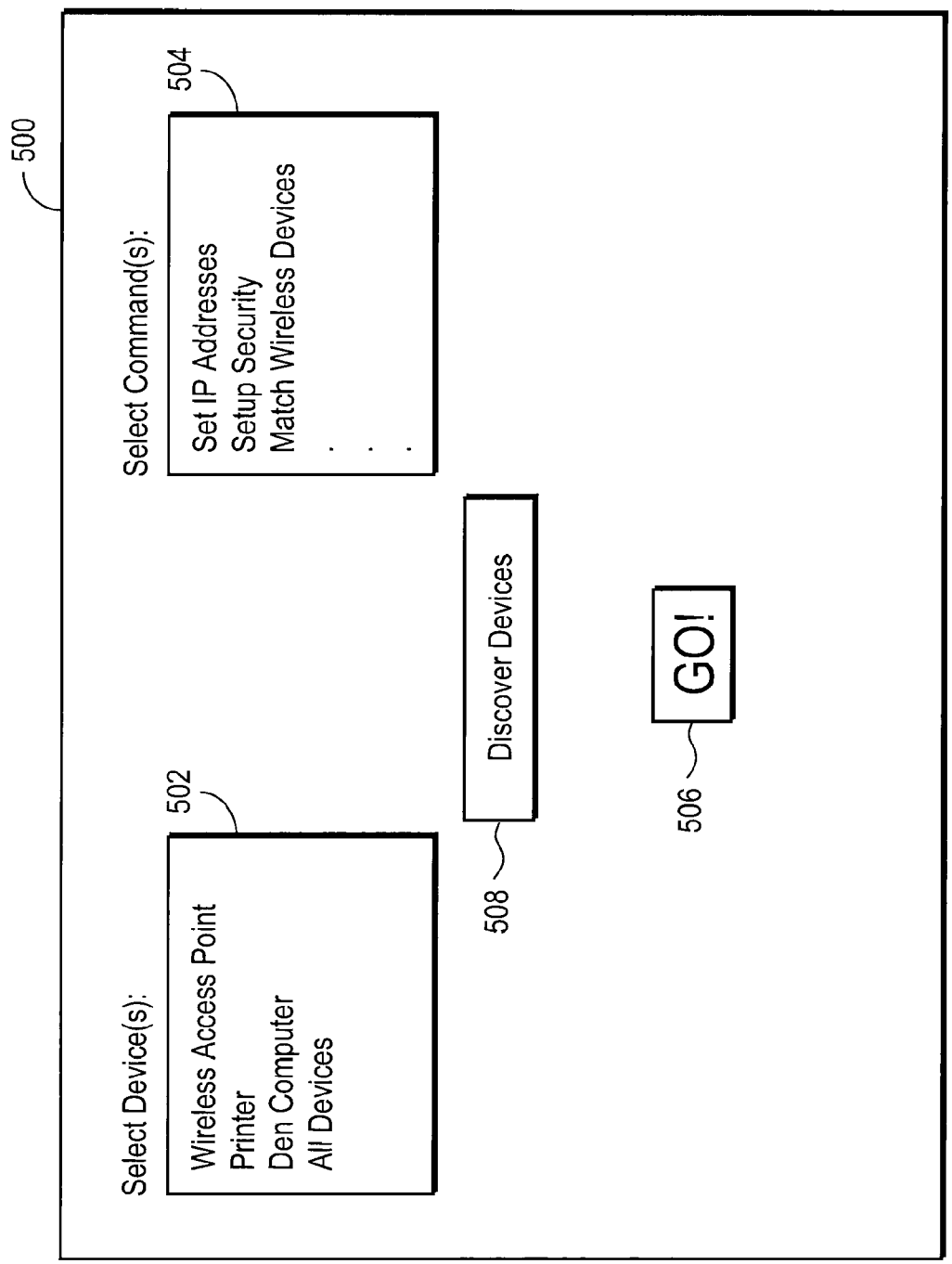
FIG. 5a is a screen shot illustrating a sample user interface according to one embodiment of the present invention.

FIG. 5a is a screen shot illustrating an example user interface 500 that allows a user to simply and easily issue commands according to the process described in FIG. 4. The user interface 500 includes a list of discovered devices 502, which in the example of FIG. 5a shows that a wireless access point, a printer, and a "den computer" have been discovered. The user may select the devices to which commands are to be issued by selecting one or more devices from the list 502. The list 502 also has an "all devices" entry that allows the user to select all discovered devices more simply than individually selecting each device from the list 502.

The user interface 500 also includes a list of commands that may be issued 504. In the example of FIG. 5a, this list includes a "set IP addresses" command, which will cause each device selected from the device list 502 to be configured to have an IP address that allows the devices on the network 100 to communicate using TCP/IP. The list 504 also includes a "setup security" command, which will cause each device selected from the device list 502 to implement security measures to prevent unwanted access to data. Finally, the list 504 includes a "match wireless devices" command, which causes an issuing wireless device to be configured to communicate properly with one or more other wireless devices on the network 100. The command list 504 may include some or all of the above described commands, and may also include additional commands.

Once the user has selected one or more devices from the device list 502, and one or more commands from the command list 504, the user indicates that the computer 102 should issue the command(s). In the example of FIG. 5a, the user does so by selecting the "go" command 506. Thus, it is very simple for a user to issue commands and configure devices on a network 100.

FIG. 5a also shows a "discover devices" command 508. The user can simply select the "discover devices" command 508 and the computer will use DAP and CP to discover devices on the network 100, as described above with respect to FIG. 2. The user does not have to select a device from the device list 502 or a command from the command list 504 to cause the computer to discover devices. Once inside the user interface 500, the user can simply perform the single step of selecting the "discover devices" command 508.

Figure 5B:
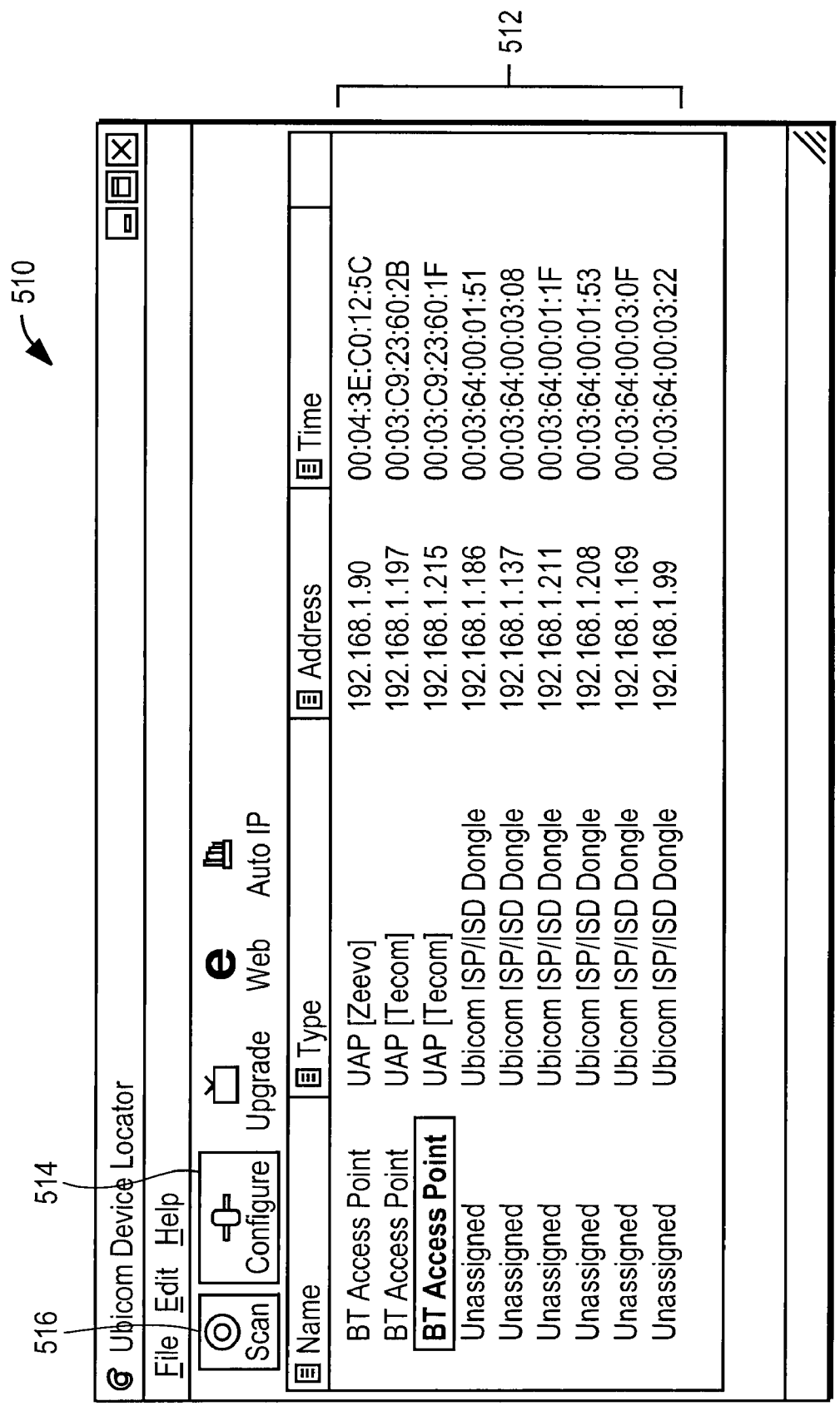
FIGS. 5b and 5c are screen shots illustrating another embodiment of a user interface according to one embodiment of the present invention.
Figure 5C:
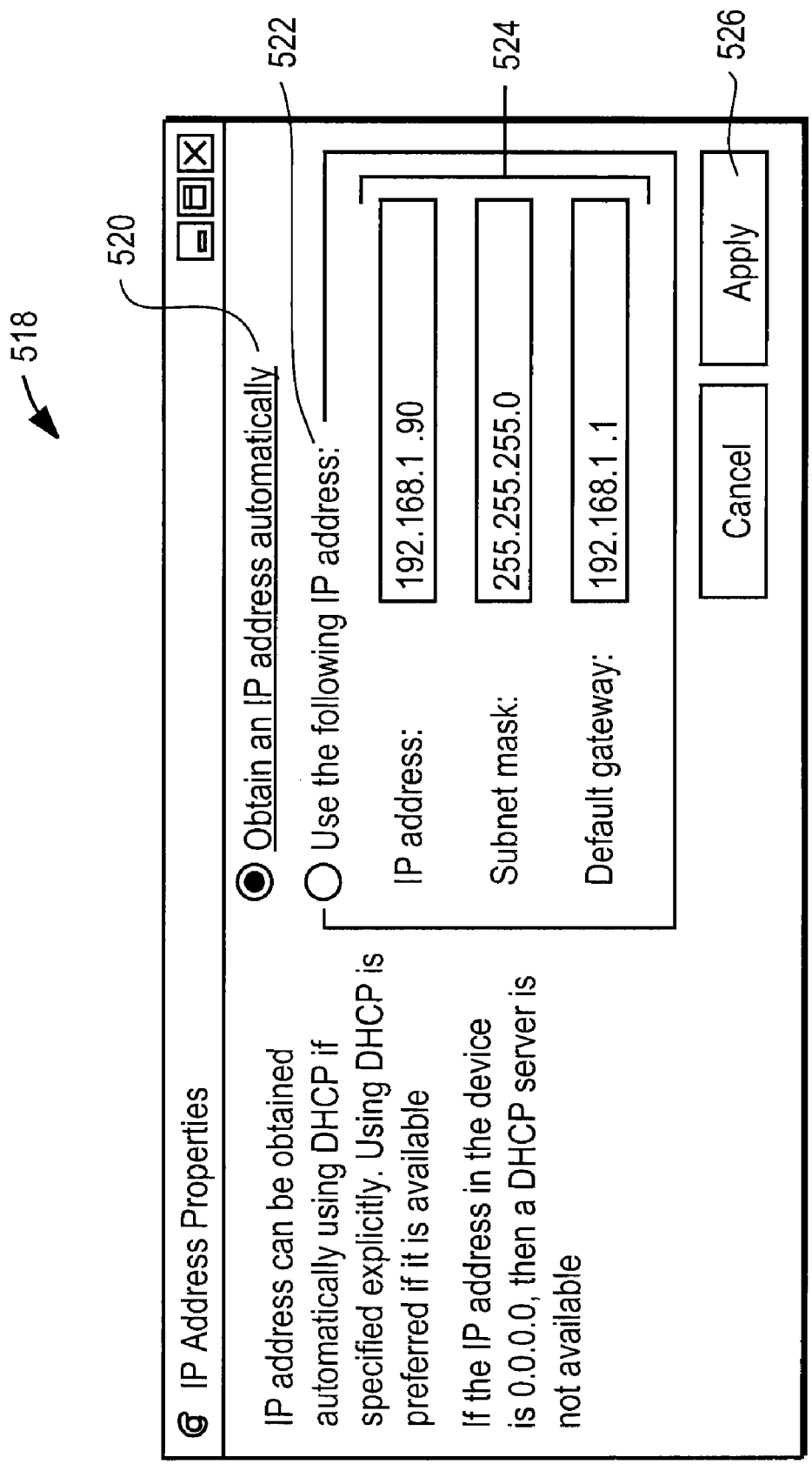

FIGS. 5b and 5c are screen shots illustrating another embodiment of a user interface that allows a user to simply and easily issue commands according to the process described in FIG. 4. FIGS. 5b and 5c illustrate how a user can simply and easily issue the command to assign IP addresses to devices on the network 100. FIG. 5b is a first screen shot that shows a first user interface screen 510 presented to a user. The user may select the "scan" command 516, and the computer will use DAP and CP to discover devices on the network 100, as described above with respect to FIG. 2. Thus, once the user has accessed the user interface, the user can cause devices on the network 100 to be discovered through the single step of selecting the "scan" command. Alternatively, the computer may automatically discover devices on the network 100, such as when the user interface program is begun, or when the computer is turned on.

The discovered devices are listed in discovered device list 512. The user may select one or more devices from the list 512. Once the user has selected devices from the list 512, the user may select the "configure" command 514 which allows the user to issue commands to configure the selected devices.

FIG. 5c is a second screen shot that shows a second user interface screen 518 presented to the user. The user may enter commands to configure the devices selected on the first screen 510. In the example in FIG. 5c, the user can set the IP address of the selected device. The user can choose with a first command 520 for the computer to automatically set the IP address of the selected device, or the user can choose with a second command 522 to assign a particular IP address 524 to the selected device. Once the user has chosen the method of address assignment, the user selects the "apply" command 526, and the selected device is configured with an IP address.

Returning to FIG. 4, the wireless device 112 (and any other devices chosen by the user) receives the command and performs 410 the command action. DAP and CP have allowed the computer 102 to perform a method call on a remote device, to configure or otherwise command the remote device. The wireless device 112 sends 412 to the computer 102 an acknowledgement that the command has been followed, as well as (in response to some commands) additional information. The computer 102 receives 414 the acknowledgment and any additional information, and stores it if necessary.

Specific Examples of Simplified Device Configuration:

FIG. 4 illustrates the general process of how DAP and CP are used to issue commands to devices. What follows are some examples of specific commands. Other commands, in addition to those described below, may also be implemented in accordance with the present invention.

Figure 6:
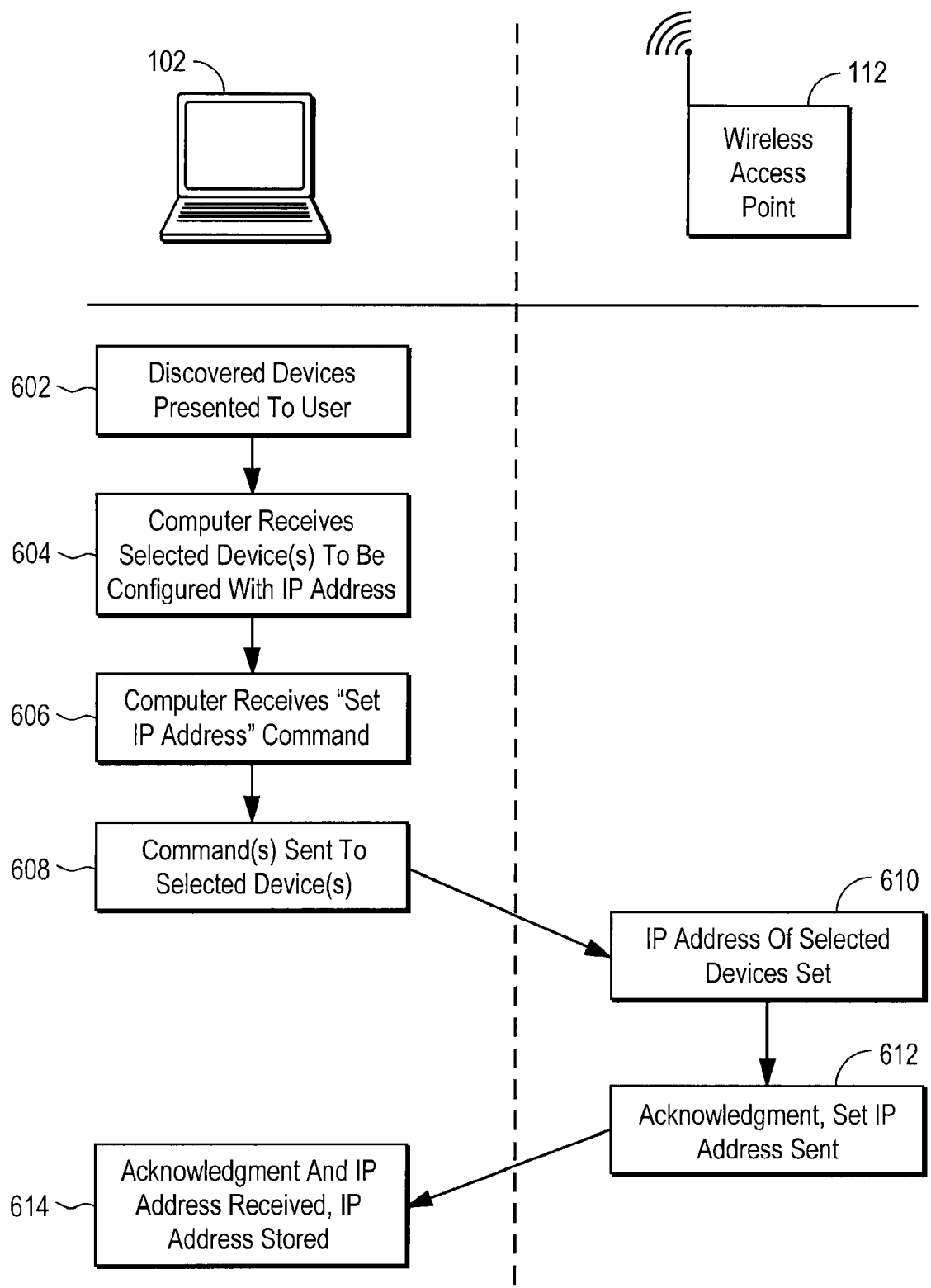
FIG. 6 illustrates how discovered devices are properly configured with IP addresses according to one embodiment of the present invention.

FIG. 6 illustrates how discovered devices are properly configured with IP addresses that allow the devices on the network to communicate using IP. As described above with respect to FIG. 4, the list of discovered devices are presented 602 to the user and the computer 102 receives 604 the user's selection of which devices are to receive the IP address configuration command. The computer then receives 606 the user's selection of the "set IP address" command. The computer 102 sends 608 the "set IP address" command to all the selected devices along with the IP address which that device should use.

Figure 7:
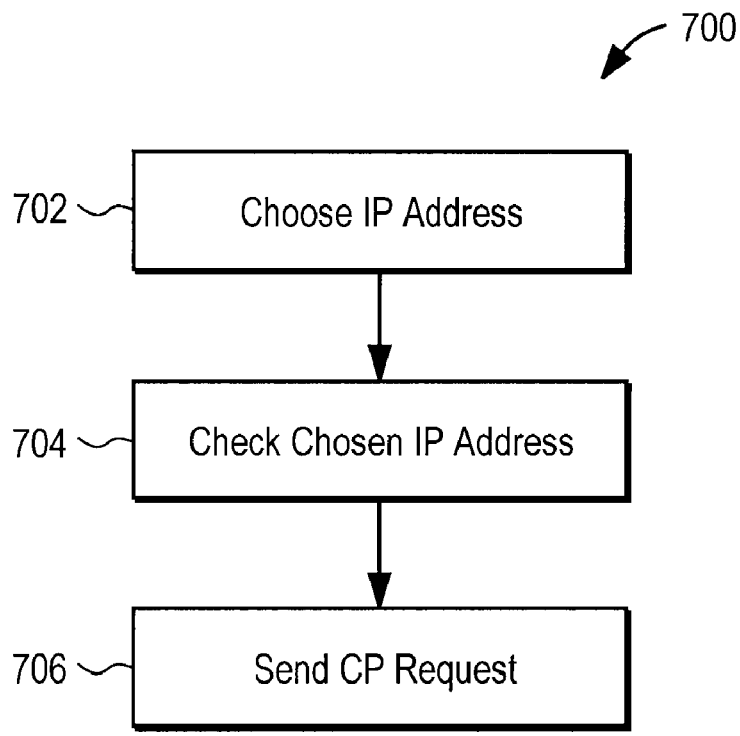
FIG. 7 is a flow chart illustrating how the computer selects and sends an IP address according to one embodiment of the present invention.

FIG. 7 is a flow chart illustrating in more detail how the computer 102 selects and sends 608 an IP address for each device. The computer 102 first chooses 702 an IP address on the same subnet as the computer 102. In one embodiment, the IP address is chosen randomly, although other methods may also be used. The computer 102 then checks 704 whether the chosen IP address is already in use by a device on the network 100. In one embodiment, the computer 102 checks 704 whether the chosen IP address is already in use by sending an Internet Control Message Protocol (ICMP) packet with an echo request, although other methods may also be used. Once the computer 102 has confirmed that the IP address is not currently in use, it sends a CP request to the device that will cause the device to set its IP address to the chosen IP address.

Figure 8:
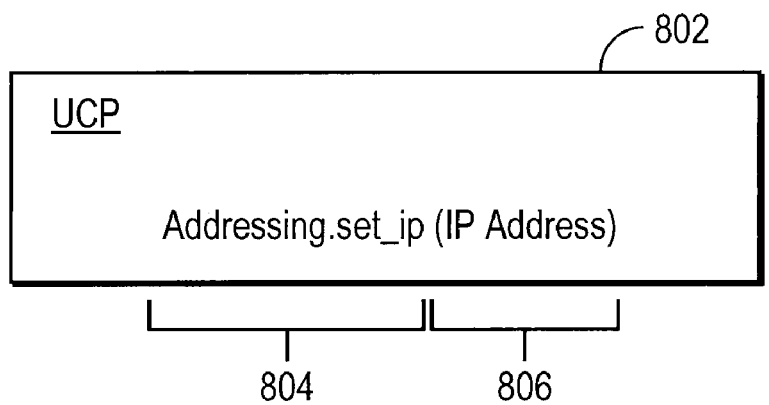
FIG. 8 is a block diagram illustrating the CP request packet used to set a target device's IP address according to one embodiment of the present invention.

FIG. 8 is a block diagram illustrating the CP request packet 802 sent by the computer 102 to set a target device's IP address. The CP packet 802 includes the "Addressing.set_ip" method 804, and an argument 806 to that method. The argument 806 to the "Addressing.set_ip" method 804 is the IP address that the receiving device should set as its IP address.

Returning to FIG. 6, the wireless access point 112 receives the CP request packet. The method call within the CP packet causes the wireless access point 112 remote from the computer 102 to set 610 its IP address to the IP address that is the argument of the "Addressing.set_ip" method 804 in the CP packet. The wireless access point 112 then sends 612 a CP response packet to the computer 102 indicating that the IP address of the wireless access point 112 has been set as requested. The CP response packet may also include the IP address of the wireless access point 112 to confirm it was set correctly. The computer 102 receives 614 the response packet and optionally stores the IP address of the wireless access point 112. Thus, the present invention allows a user to easily configure devices to have valid IP addresses. This allows the user to easily configure network devices so that applications that communicate with TCP/IP will operate correctly. Devices on a network 100 can also be similarly configured with IP addresses automatically without user intervention, for example in response to being discovered on the network 100 as described with respect to FIG. 2.

Figure 9:
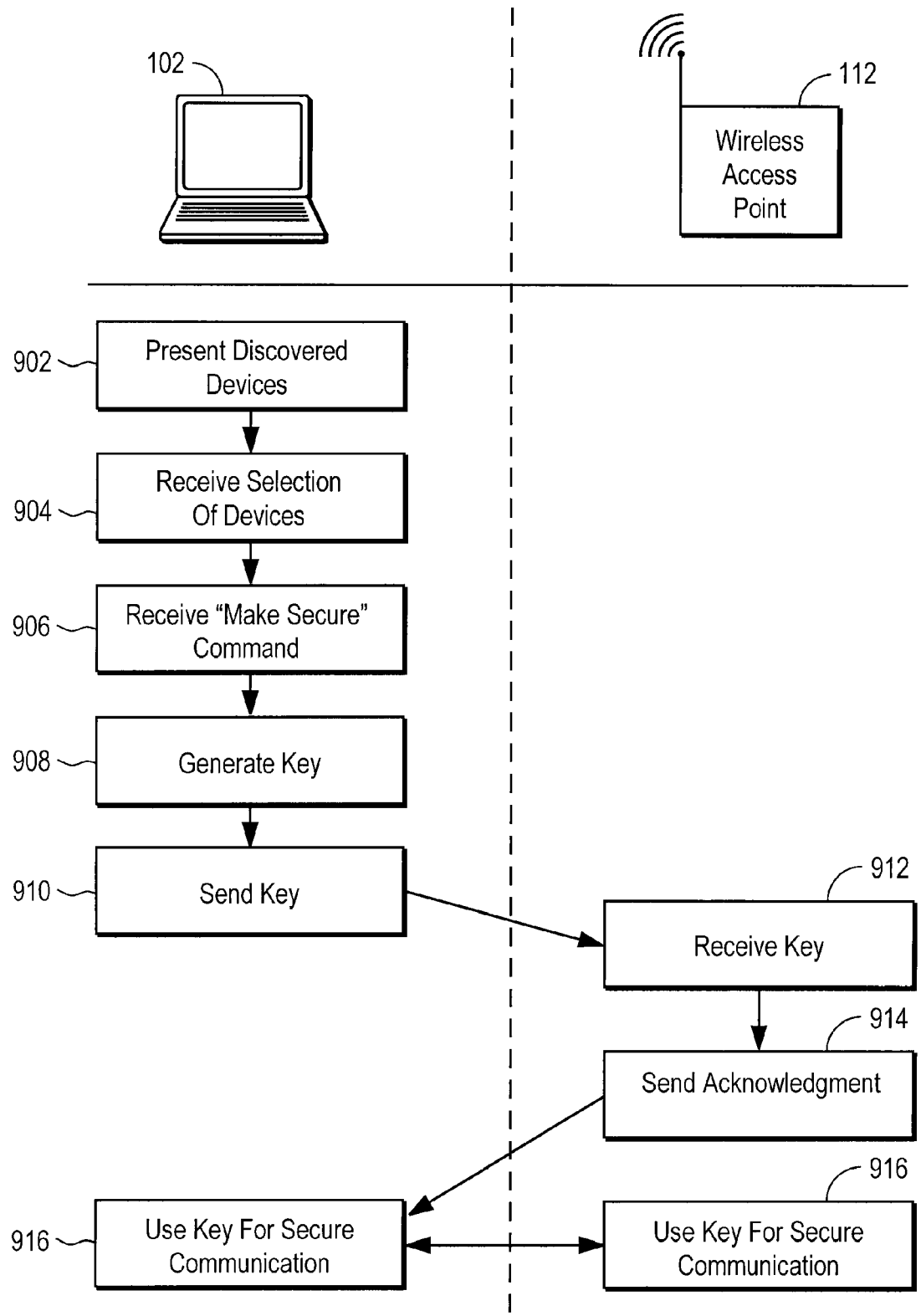
FIG. 9 illustrates how discovered devices are configured to implement additional security measures according to one embodiment of the present invention.

FIG. 9 illustrates how discovered devices are configured to implement additional security measures. As described above with respect to FIG. 4, the list of discovered devices are presented 902 to the user and the computer receives 904 the devices selected by the user to implement-secure communication. In this example, the computer receives 904 a selection of the wireless access point 112. The computer 102 receives 906 the "make secure" command indicating that security measures should be implemented on communication between the computer 102 and the selected device(s). The user interface may also provide a single "make secure" command, such as a "make secure" button, so the user can cause communication with all devices on the network 100 to be secure with a single action, rather than individually selecting devices.

The computer 102 generates 908 a key and sends 910 this key to the wireless access point 112 (or other selected device(s)). This key is typically sent as an argument in a CP "make secure" remote method call request, and will be used to allow secure encrypted communication between the devices.

The wireless access point 112 receives 912 the CP "make secure" request packet and the key. In one embodiment, the transmission of the key between the computer 102 and the wireless access point 112 occurs without security measures. While this allows an unauthorized accessor to intercept the key, and negate encryption implemented with the key, it is unlikely that an intruder would be monitoring communication at just the right time to be able to intercept the key. Further, this method of key transmission has the advantage of simplicity. However, if more security is desired, the key may be transmitted using a Diffie-Hellman key exchange or other technique that provides more protection for the transmission of the key itself.

The wireless access point 112 sends 914 an acknowledgment of reception of the key. Thereafter, the computer 102 and the wireless access point 112 may use the key to communicate 916 securely by encrypting transmitted data. Thus, the user can easily implement secure communication between networked devices with just a single action within the user interface. As with other device configuration operations, communication between devices on a network can be made secure automatically by the computer 102 without user intervention. For example, a "make secure" remote method call may be sent automatically in response to the computer 102 discovering devices on the network 100.

Figure 10:
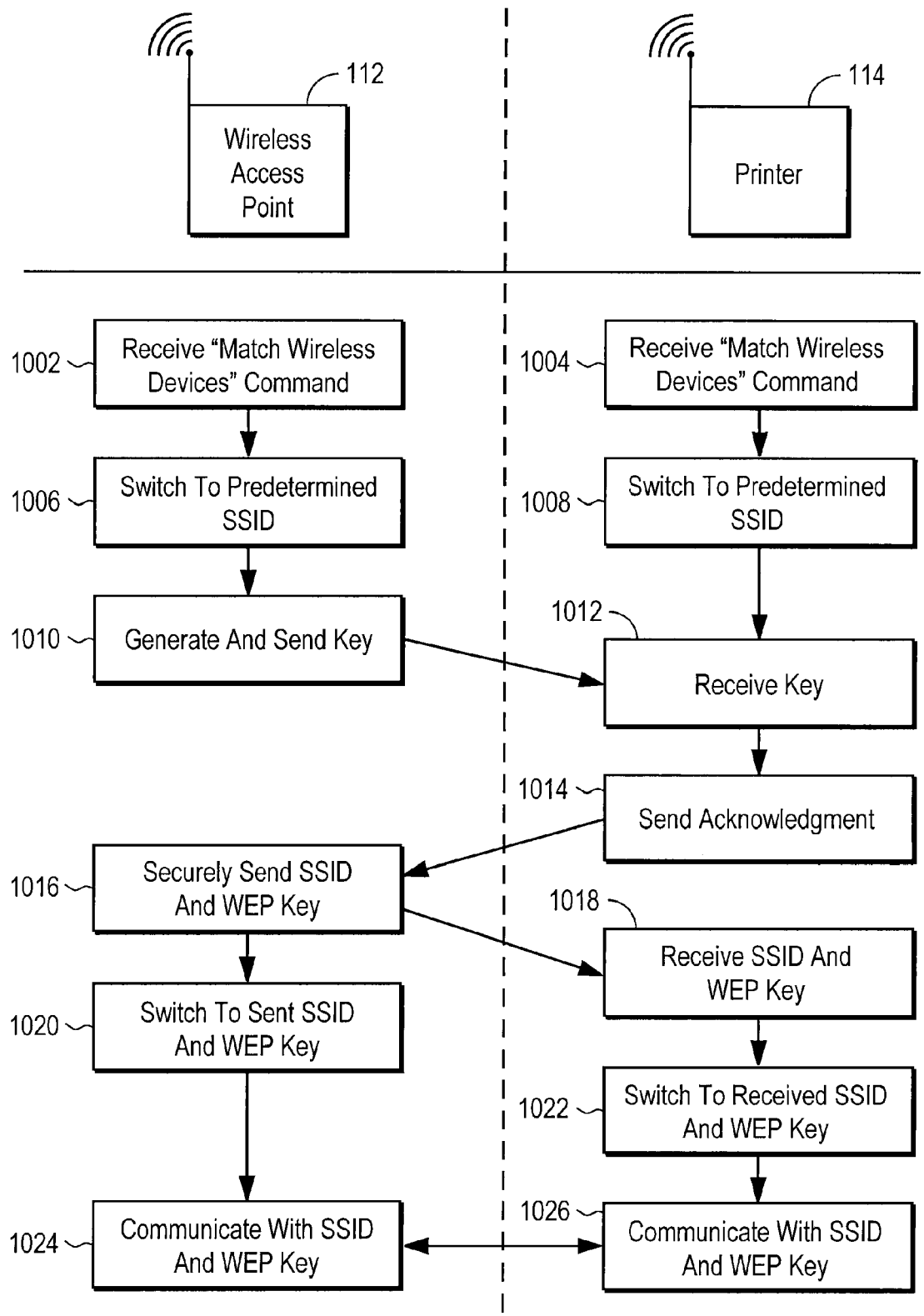
FIG. 10 illustrates how wireless devices are matched according to one embodiment of the present invention.

FIG. 10 illustrates how wireless devices are matched to be on the same logical network and use secure communication methods. Multiple wireless access points that are part of different logical networks may be close enough so that a wireless device may communicate with both, which requires specification of the logical network on which the wireless device should be. Further, with wireless communication, nearby wireless devices can eavesdrop on the wireless data being sent, which increases the need for secure data transmission. In the 802.11 standard, the SSID is used to identify the logical network to which a wireless device belongs, and WEP is used to secure data transmission. The example of FIG. 10 describes how to easily configure wireless devices with the correct SSID and to use WEP. This allows the devices to communicate with each other, and prevents unauthorized devices from intercepting or understanding the communications, or communicating with the devices itself. Typically, the wireless matching process is performed with a master device, such as a wireless access point 112, and one or more slave devices, such as a wireless printer 114. The wireless access point 112 is referred to as the master device, because the slave devices communicate with the rest of the network 100 through that wireless access point 112. In the described example, a wireless access point 112 is matched with a wireless printer 114.

Both the wireless access point 112 and the wireless printer 114 receive 1002, 1004 "match wireless devices" commands. Since typically neither a wireless access point 112 nor a printer 114 will have a software user interface, in one embodiment the user gives this command by activating a physical button or other mechanism on each device. This activation can occur, for example, by a user pressing the button. In one embodiment, the button on the printer 114 is pressed within a predetermined time of pressing the button on the wireless access point 112 in order for the matching process to occur. This provides a further level of security: only those with physical access to both devices can enable matching and communication between the devices. An unauthorized accessor cannot enable an unauthorized device, such as wireless computer 116, to eavesdrop on communication between the matched devices without physical access to the master device. With devices that do have software user interfaces, such as computer 102, the "match wireless devices" command may be received via a software user interface rather than a physical button.

After receiving 1002, 1004 the "match wireless devices" commands, the wireless access point 112 and printer 114 switch 1006, 1008 to a predetermined SSID so that they are on the same logical wireless network. The wireless access point 112 and printer 114 may also optionally switch to a predetermined WEP key for further security for communication during this step in the process. The wireless access point 112 then generates and sends 1010 a key that will allow secure communication between the wireless access point 112 and printer 114. In one embodiment, the key is sent as an argument to a CP request, encapsulated in DAP.

The wireless printer 114 receives 1012 the CP request packet with the key. The CP command is a remote method call that causes the wireless printer 114 to start using the key, an argument to the CP method, for secure communication. The transmission of the key between the wireless access point 112 and the wireless printer 114 may occur without security measures. While this would allow an unauthorized accessor to intercept the key, and negate security measures implemented using the key, it is unlikely that the unauthorized accessor would be monitoring communication at just the right time to be able to intercept the key. Further, this method of key transmission has the advantage of simplicity. However, if more security is desired, the key may be transmitted using a Diffie-Hellman key exchange or other technique that provides more protection for the transmission of the key itself. Additionally, as mentioned above, the wireless access point 112 and printer 114 may have switched to a predetermined WEP key, which makes the communication sending the key secure from devices that do not use the predetermined WEP key.

The wireless printer 114 sends 1014 acknowledgement of reception of the key. This acknowledgement may be a secure communication using the transmitted key. The wireless access point 112 uses the key to securely send 1016 the SSID and WEP key which the wireless access point 112 and wireless printer 114 will use for future secure communication. In one embodiment, this is done through a remote method call using CP, with SSID and WEP as arguments to the CP method call. Both the wireless access point 112 and wireless printer 114 then switch 1020, 1022 to the sent SSID and WEP key, and communicate 1024, 1026 securely using the sent SSID and WEP key.

Figure 11:
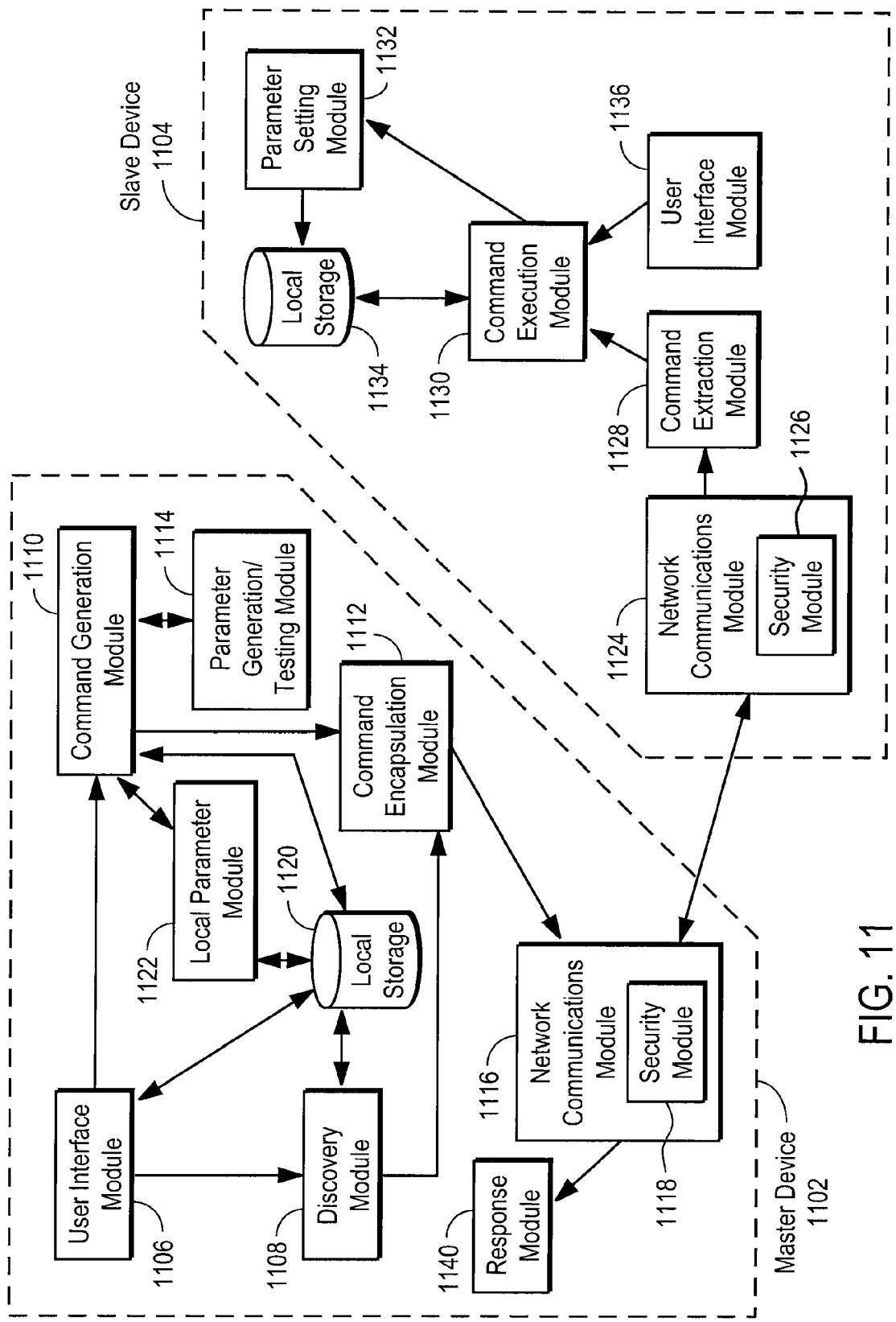
FIG. 11 is a block diagram illustrating example master and slave devices according to one embodiment of the present invention.

FIG. 11 is a block diagram illustrating one embodiment of master and slave devices 1102 and 1104, and the components that function to provide the simplified networked device configuration and security implementation. Other embodiments of the master and slave devices 1102, 1104 may also be used to provide simplified networked device configuration and security implementation.

The example master device 1102 operates to issue commands to remote slave devices 1104 on the network 100. The master device 1102 includes a user interface module 1106. The user interface module 1106 allows a user to select commands and devices for configuration, as described above. The user interface module may provide the user with a software user interface, for example an interactive display screen when the master device 1102 is a computer, or the user interface may be one or more physical mechanisms, such as a button on the exterior of the master device 1102. The user interface module 1106 is connected with master device local storage 1120, a command generation module 1110, and a discovery module 1108.

The discovery module 1108 discovers the devices on the network 100 as described above with respect to FIG. 2. This can occur in response to a user command via the user interface module 1106, or may happen automatically. The discovered devices are stored in the local storage 1120.

These devices can then be presented to the user via the user interface module 1106. A user selects devices to receive the commands using the user interface module 1106. The user selects commands using the user interface module 1106. The selected commands are communicated from the user interface module 1106 to the command generation module 1110. The command generation module 1110 then generates the remote method call requests that the master device 1102 will transmit to the slave device 1104 selected by the user to receive the commands. The command generation module 1110 is connected with master device local storage 1122, so that the command generation module 1110 may retrieve stored command templates from storage 1120. The command generation module 1110 communicates with a parameter generation and testing module 1114. Alternatively, the parameter generation and testing module 1114 may be a submodule within the command generation module 1110. If necessary, the parameter generation and testing module 1114 generates and tests parameters that will be sent to the slave device 1104. For example, when the command generation module 1110 generates a "set IP address" command, the parameter generation and testing module 1114 generates and tests the IP address that makes up the arguments of the "set IP address" command.

After the command and any parameters have been generated, the generated command is sent to the command encapsulation module 1112. The command generation module 1110 also communicates with a local parameter module 1122. The local parameter module 1122 sets and stores local parameters, such as the IP address and, if the master device 1102 is a wireless device, the SSID of the master device 1102.

The command encapsulation module 1112 receives the generated commands with their arguments and retrieves from local storage 1120 the addresses for the devices to which the commands will be sent. The command encapsulation module 1112 then forms a data packet that includes all this information. In one embodiment, the packet includes a DAP packet with the address as well as a CP packet with the command and arguments. The encapsulated commands are then sent to the network communications module 1116.

The network communications module 1116 communicates with the remote devices over the network 100. For example, in FIG. 11, the master device 1102 network communications module 1116 transmits data to and receives data from the slave device 1104 network communications module 1124 via network link 1138. If security, such as encryption is enabled, the security modules 1118 and 1126 on the network communications modules 1116 and 1124 of the master device 1102 and slave device 1104 act to encrypt outgoing data and decrypt incoming data.

The network communications module 1116 also communicates with the response module 1140 of the master device 1102. Acknowledgments and other response received from slave devices are sent from the network communications module 1116 to the response module 1140, which then stores the response information in the local storage 1120, or otherwise acts on the response information as appropriate.

The network communications module 1124 of the slave device 1104 receives encapsulated commands in the form of configuration packets from the network communications module 1116 of the master device 1102. After decryption by the security module 1126, if necessary, the network communications module 1124 determines if the received command is addressed to that slave device 1104. If so, the network communications module 1124 sends the command to the command extraction module 1128. The command extraction module 1128 identifies the command and the arguments in the received configuration packet and sends this information to the command execution module 1130. The command execution module 1130 retrieves any necessary information from the local storage 1134 and executes the command. If the execution of the command involves setting a parameter, such as an IP address, at the slave device 1104, the command execution module 1130 communicates the parameter to the parameter setting module 1132. The parameter setting module 1132 then sets the parameter of the slave device 1104 as instructed by the received command and arguments.

If the command received prompts for a response from the slave device 1104, the command execution module 1130 forms the response, using information from the parameter setting module 1132 or local storage 1134 if necessary. The response is then sent to the command extraction module 1128, which can also encapsulate the response. Alternatively, separate response generation and/or encapsulation modules (not shown) may be included to generate and encapsulate the response. The network communications module 1124 then sends the response over the network to the master device 1102.

The slave device 1104 may also have a user interface module 1136. This may be a software user interface, for example an interactive display screen when the slave device 1104 is a computer, or the user interface may be one or more physical mechanisms. Alternatively, the slave device 1104 may not include a user interface module 1136 at all.

While the invention has been particularly shown and described with reference to an embodiment and several alternate embodiments, it will be understood by persons skilled in the relevant art that various changes in form and details can be made therein without departing from the spirit and scope of the invention.

What is claimed is:

1. A method for providing simple configuration for communication between a plurality of wireless devices on a wireless network, the configuration including implementation of security for data communication and setting a logical network parameter for the plurality of wireless devices, comprising:

receiving a configuration command at a first wireless device of the plurality of wireless devices;

setting, in response to receiving the configuration command, the logical network parameter of the first wireless device to a predetermined configuration;

receiving the configuration command at a second wireless device of the plurality of wireless devices;

setting, in response to receiving the configuration command, the logical network parameter of the second wireless device to the predetermined configuration;

selecting, at the first wireless device, a configuration logical network parameter;

sending a configuration packet including the selected configuration logical network parameter from the first wireless device and an address of the second wireless device to the second wireless device;

selecting, at the first wireless device, an encryption key for encrypting communication between the first and second wireless devices;

sending an encryption packet including the selected encryption key and the address of the second wireless device from the first wireless device to the second wireless device;

setting the logical network parameter of the first and second wireless devices to the configuration logical network parameter; and encrypting data sent between the first and second wireless devices with the selected encryption key, wherein the configuration packet comprises:

an Internet Protocol (IP) header with a target IP address, the target IP address being broadcast; and a device addressing protocol (DAP) header with a target DAP address and a source DAP address, the target DAP address being broadcast and the source DAP address being a DAP address of the first wireless device.

2. The method of claim 1, further comprising performing a public key exchange wherein the encryption key sent from the first wireless device to the second wireless device is encrypted by a public key of the second device.

3. The method of claim 1, further comprising performing a Diffie-Hellman key exchange wherein the encryption key sent from the first wireless device to the second wireless device is sent in an encrypted form.

4. The method of claim 1, further comprising receiving, at the first device, a response from the second wireless device, the response including the DAP address of the second wireless device.

5. The method of claim 1, wherein the encryption key is sent from the first wireless device to the second wireless device within an encryption packet that comprises:

an encryption IP header with a target encryption IP address; and an encryption device addressing protocol (DAP) header with a target encryption DAP address, the target encryption DAP address being the DAP address of the second wireless device.

6. The method of claim 1, wherein the configuration command received by at least one of the first wireless device and the second wireless device is received in response to activation of a physical mechanism on the at least one of the first wireless device and the second wireless device.

* * * * *

UNITED STATES PATENT AND TRADEMARK OFFICE
CERTIFICATE OF CORRECTION

| | | |
|---|---|---|
| PATENT NO. | : 7,356,011 B1 | |
| APPLICATION NO. | : 10/323439 | |
| DATED | : April 8, 2008 | |
| INVENTOR(S) | : Christopher J. F. Waters and Nicholas J. Kelsey | |

It is certified that error appears in the above-identified patent and that said Letters Patent is hereby corrected as shown below:

On the title page, item (75), under Inventors:

Please replace "Nicholas J Kelsey" with --Nicholas J. Kelsey--

Signed and Sealed this

First Day of July, 2008

JON W. DUDAS
*Director of the United States Patent and Trademark Office*